(12) United States Patent
Bradley et al.

(10) Patent No.: US 7,653,544 B2
(45) Date of Patent: Jan. 26, 2010

(54) METHOD AND APPARATUS FOR WEBSITE NAVIGATION BY THE VISUALLY IMPAIRED

(75) Inventors: Nathan T. Bradley, Tucson, AZ (US); David Ide, Tucson, AZ (US)

(73) Assignee: AudioEye, Inc., Tucson, AZ (US)

( * ) Notice: Subject to any disclaimer, the term of this patent is extended or adjusted under 35 U.S.C. 154(b) by 997 days.

(21) Appl. No.: 10/637,970

(22) Filed: Aug. 8, 2003

(65) Prior Publication Data
US 2005/0033577 A1 Feb. 10, 2005

(51) Int. Cl.
*G10L 21/00* (2006.01)
(52) U.S. Cl. .................... 704/270.1; 704/260; 704/277; 704/275
(58) Field of Classification Search ................. 704/260, 704/235, 277, 271, 270, 270.1, 275; 707/104.1, 707/513; 709/203, 219, 231, 217; 715/500.1, 715/733, 513
See application file for complete search history.

(56) References Cited

U.S. PATENT DOCUMENTS

| | | | | |
|---|---|---|---|---|
| 5,991,781 | A * | 11/1999 | Nielsen ...................... | 715/513 |
| 6,240,448 | B1 * | 5/2001 | Imielinski et al. .......... | 709/218 |
| 6,606,374 | B1 * | 8/2003 | Rokoff et al. ............ | 379/88.16 |
| 6,934,684 | B2 * | 8/2005 | Alpdemir et al. ............ | 704/265 |
| 7,106,220 | B2 * | 9/2006 | Gourgey et al. ............... | 341/27 |
| 7,124,366 | B2 * | 10/2006 | Foreman et al. ............. | 715/719 |
| 2002/0003547 | A1 | 1/2002 | Wang | |
| 2002/0007379 | A1 | 1/2002 | Wang | |
| 2002/0065658 | A1 * | 5/2002 | Kanevsky et al. ........... | 704/260 |
| 2002/0124020 | A1 * | 9/2002 | Janakiraman et al. ....... | 707/513 |
| 2003/0158737 | A1 * | 8/2003 | Csicsatka .................... | 704/273 |

OTHER PUBLICATIONS

Sensus Internet Browser, printed from www/sensus.dk/sib10uk.htm on Jul. 23, 2002.

* cited by examiner

*Primary Examiner*—Vijay B Chawan
(74) *Attorney, Agent, or Firm*—Etherton Law Group, LLC; Sandra L. Etherton; Benjamin D. Tietgen

(57) ABSTRACT

The present invention is a server-side method and apparatus that enables visually-impaired users to navigate websites and hear high-quality streaming audio of narration and descriptions of each website. The system involves creating an audible website corresponding to an original website by utilizing voice talent to read and describe web content and create audio files for each section within an original website, then assigning a hierarchy and navigation system based on the original website design. To implement the system, a small program is installed on the home page of an original website which plays a tone upon a user's visit indicating that the website is accessible with the present invention. Upon hearing the tone, a user presses a key on the keyboard to exit the original website and enter the audible website. Audible narration is played through the user's computer, reading text and describing non-text information. The narration includes menus for navigating the site which have a hierarchy substantially similar to that of the original website. Users navigate the website menus and move from website to website by making keystroke commands.

22 Claims, 5 Drawing Sheets

METHOD AND APPARATUS FOR WEBSITE NAVIGATION BY THE VISUALLY IMPAIRED

CROSS-REFERENCE TO RELATED APPLICATIONS

This application claims the benefit of U.S. Provisional Application No. 60/399,892 Jul. 31, 2002.

FIELD OF INVENTION

This invention relates generally to data processing for the purpose of navigating a computer network. More particularly, this invention relates to a method and apparatus for creating audible websites and enabling visually-impaired users to access and navigate them by keystroke.

BACKGROUND

Websites and many other computer files are created with the assumption that those who are using the files can see the file content on a computer monitor. Because websites are developed with the assumption that users can see, the sites do not convey much content audibly, nor do the sites convey navigation architecture, such as menus and navigation bars, audibly. The result is that visually-impaired users have difficulty using such websites.

Prior art systems have been developed to help visually-impaired users use websites, but these systems often require software and hardware to be installed at the user's computer. Many of these systems simply use screen reading technology alone or in combination with print magnifying software applications. The systems have shown to be costly, unwieldy, and inconvenient. Furthermore, because such technology is installed on the user's computer, visually-impaired users cannot effectively use conventional computer files anywhere except at their own computers. As a consequence, websites and other computer files are often inaccessible to visually-impaired user anywhere except at home.

Several prior art systems have been developed to overcome this problem by enabling visually-impaired users to access some computer information using any touchtone telephone. In essence, a caller accesses a special computer by telephone. The computer has access to computer files that contain audio components, which can be played back though the telephone to the user. For example, a text file that has been translated by synthetic speech software into an audio file can be played back to the user over the telephone. Some systems access audio files that have already been translated; some translate text-to-speech on the fly upon the user's command. To control which files are played, the user presses the keys on the touchtone keypad to send a sound that instructs the computer which audio file to play.

Unfortunately, these systems also have drawbacks. Large files or those having multiple nesting layers turn the system into a giant automated voice response system, which is difficult to navigate and often very frustrating. Typically only text is played back to the user. Graphics, music, images and navigation systems like those on a website are not. Furthermore, the metallic voice of the computer-generated speech does not convey meaning with inflection like a human does, and is tedious to listen to, especially for significant volumes of information.

Therefore, it is an object of this invention to provide a method and apparatus to translate computer files which have previously been created for the sighted user, particularly websites, into audio files. It is a further object to create audio files that reflect the entirety of the original file, incorporating non-text content such as graphics, music, images and navigation systems like those on a website. It is another object of this invention to provide a method and apparatus to access audio files using any conventional computer system, particularly one connected to the Internet, by locating the audio files on a central computer such as a server. It is another object of this invention to provide a keystroke navigation system to navigate audio files.

SUMMARY OF THE INVENTION

The present invention is a server-side method and apparatus that enables visually impaired users to navigate websites and hear high-quality streaming audio of narration and descriptions of each website. The system involves creating an audible website by utilizing voice talent to read and describe web content and create audio files for each section within an original website, then assigning a hierarchy and navigation system based on the original website design. To implement the system, a small program is installed on the home page of an original website which plays a tone upon a user's visit indicating that the website is accessible with the present invention. Upon hearing the tone, a user presses a key on the keyboard to exit the original website and enter the audible website. Audible narration is played through the user's computer, reading text and describing non-text information. The narration includes menus for navigating the site which have a hierarchy substantially similar to that of the original website. Other non-narrative content is included in the audible website. Users navigate the website menus and move from website to website by making keystroke commands.

DETAILED DESCRIPTION OF THE INVENTION

The present invention involves creating audio files from files created originally for sighted users. Files created originally for primarily sighted-users are referred to herein as original files. An organized collection of original files is referred to herein as an original website. The invention further involves assigning a hierarchy and navigation system to the audio files based on the original website design; accessing the audio files; and navigating the audio files.

Audio files for the present invention are created by converting text, images, sound and other rich media content of the original files into audio files through a site analysis process. A live human reads the text of the original file and the speech is recorded. The human also describes non-text file content and file navigation options aloud and this speech is recorded. Non-speech content, such as music or sound effects, is also recorded, and these various audio components are placed into one or more files. Any type of content—be it FLASH, HTML, XML, .NET, JAVA, or streaming video—can be described audibly in words, music or other sounds, and can be incorporated into the audio files. A hierarchy is assigned to each audio file based on the original computer file design such that when the audio file is played back through an audio interface, sound is given forth. The user hears substantially all of the content of the file and can navigate within the file by responding to the audible navigation clues.

The audio files are accessed via a user's computer. To implement the system, a small program is installed in an original file which will play an audible tone or other sound upon opening the file, thereby indicating that the file is accessible with the present invention. Upon hearing the sound, the user indicates to the computer to open the associated audio file. The content of the audio file is played though an audio interface, which may be incorporated into the user's computer or a standalone device.

The user navigates the audio files using a keystroke navigation system. Unlike the touchtone telephone systems which require an audio input device, the present system utilized toneless navigation.

Figure 1:
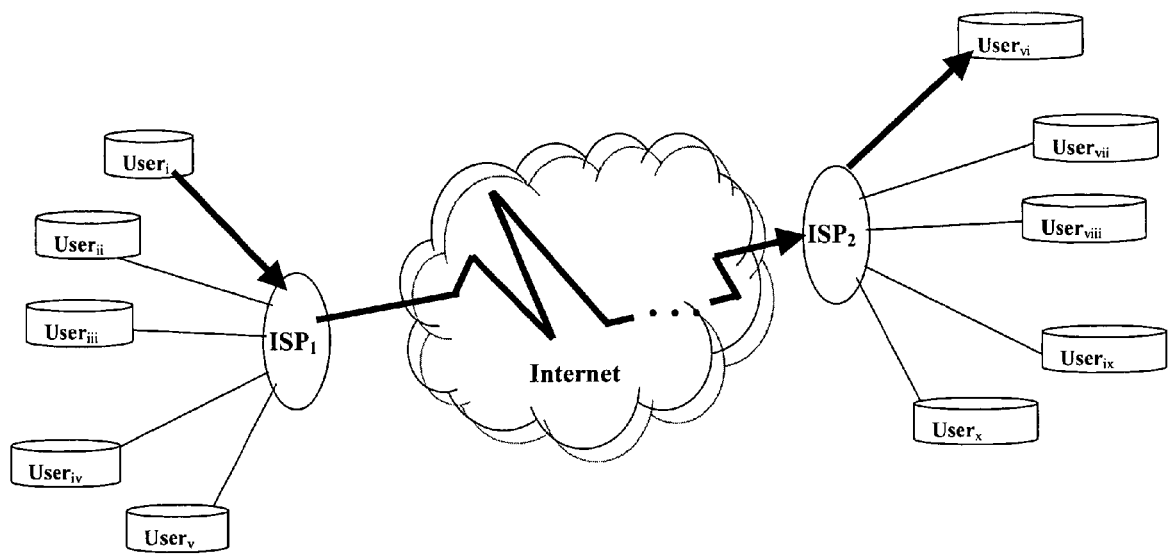
FIG. 1 illustrates the Internet.
Figure 2:
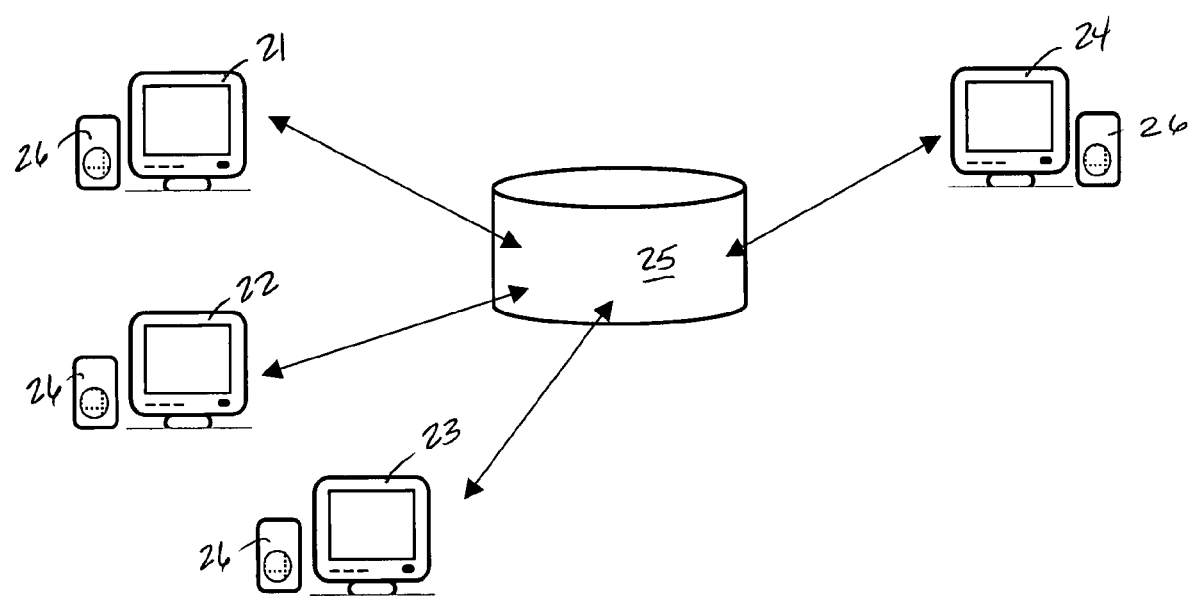
FIG. 2 illustrates a computer network.

One advantage of the present invention over prior art is that no specialized software or hardware needs to be installed on the user's computer because the audio files are installed on remote computers and accessed over a network. This type of application is commonly referred to as a server-side application, to differentiate it over a client-side, or user, application. The preferred embodiment of the present invention is applied to original web pages hosted on remote computers of a global computer network, namely the Internet. FIG. 1 illustrates a plurality of users' computers, indicated as $user_i \ldots user_x$, communicate with each other through remote computers networked together to form the Internet. Typically, users connect to the Internet via an Internet service provider, abbreviated in FIG. 1 as ISP. However, the present invention may also be used for smaller computer networks, such as local area or wide area networks. FIG. 2 illustrates such a network, where a plurality of users' computers, 21, 22, 23 and 24 communicate through a server 25. In this example, each users' computers has a standalone audio interface 26 to play audio files. Alternatively, the audio interface could be incorporated into the users' computers.

Figure 3:
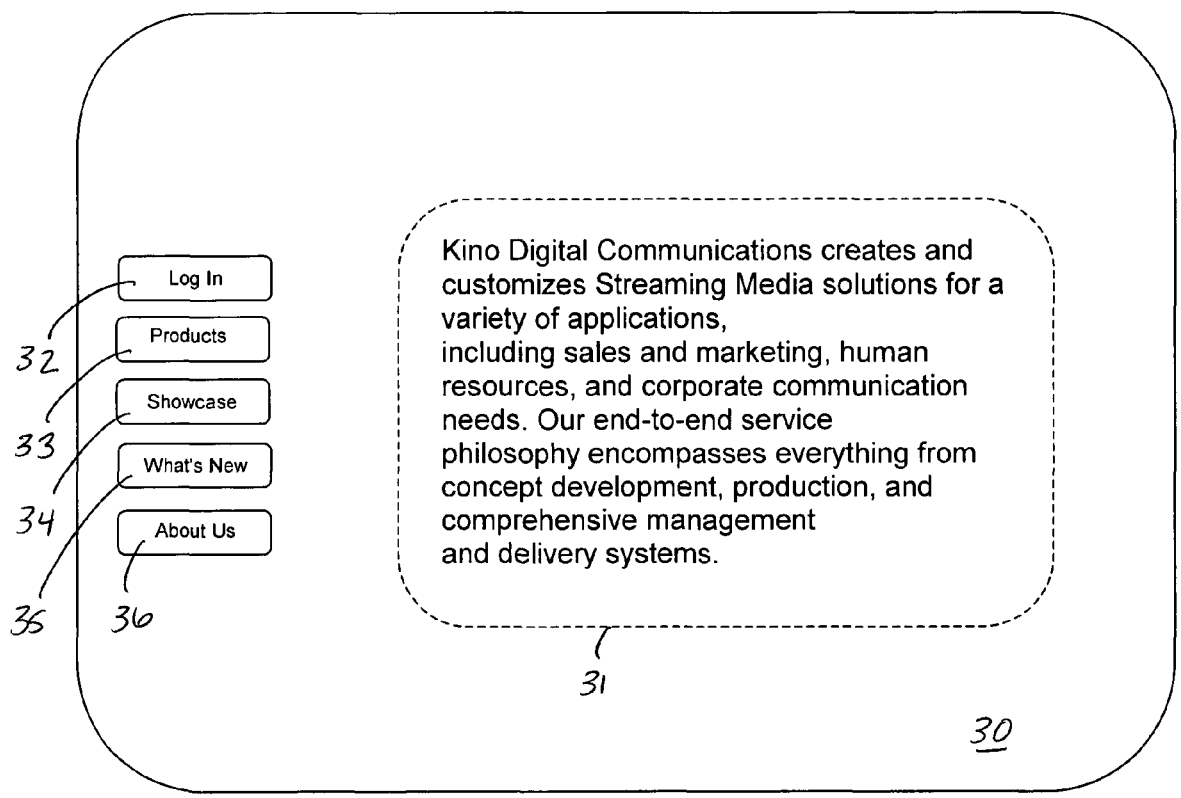
FIG. 3 illustrates a home page of an original website.

In the preferred embodiment, an original website is converted to an audible website. Each file, or page, of the original website is converted to a separate audio file, or audio page. The collection of associated audio files resides on a remote computer or server, and creates the audible website. For example, FIG. 3 illustrates the home page 30 of an original website. A live human reads aloud the text content 31 of the home page 30 and the speech is recorded into an audio file. The human says aloud the menu options 32, 33, 34, 35, 36 which are "LOG IN", "PRODUCTS", "SHOWCASE", "WHAT'S NEW", and "ABOUT US", respectively, that are visible on the original website. This speech is also recorded.

In a similar fashion, a live human reads aloud the text content and menu options of other files in the original website and the speech is recorded into audio files. In this example, key 1 is assigned to menu option 32, LOG IN; key 2 is assigned to menu option 33, PRODUCTS; key 3 is assigned to menu option 34, SHOWCASE; key 4 is assigned to menu option 35, WHAT'S NEW; key 5 is assigned to menu option 36, ABOUT US. Other visual components of the original website may also be described in speech, such as images or colors of the website, and recorded into one or more audio files. Non-visual components may also be recorded into the audio files, such as music or sound effects.

Figure 4:
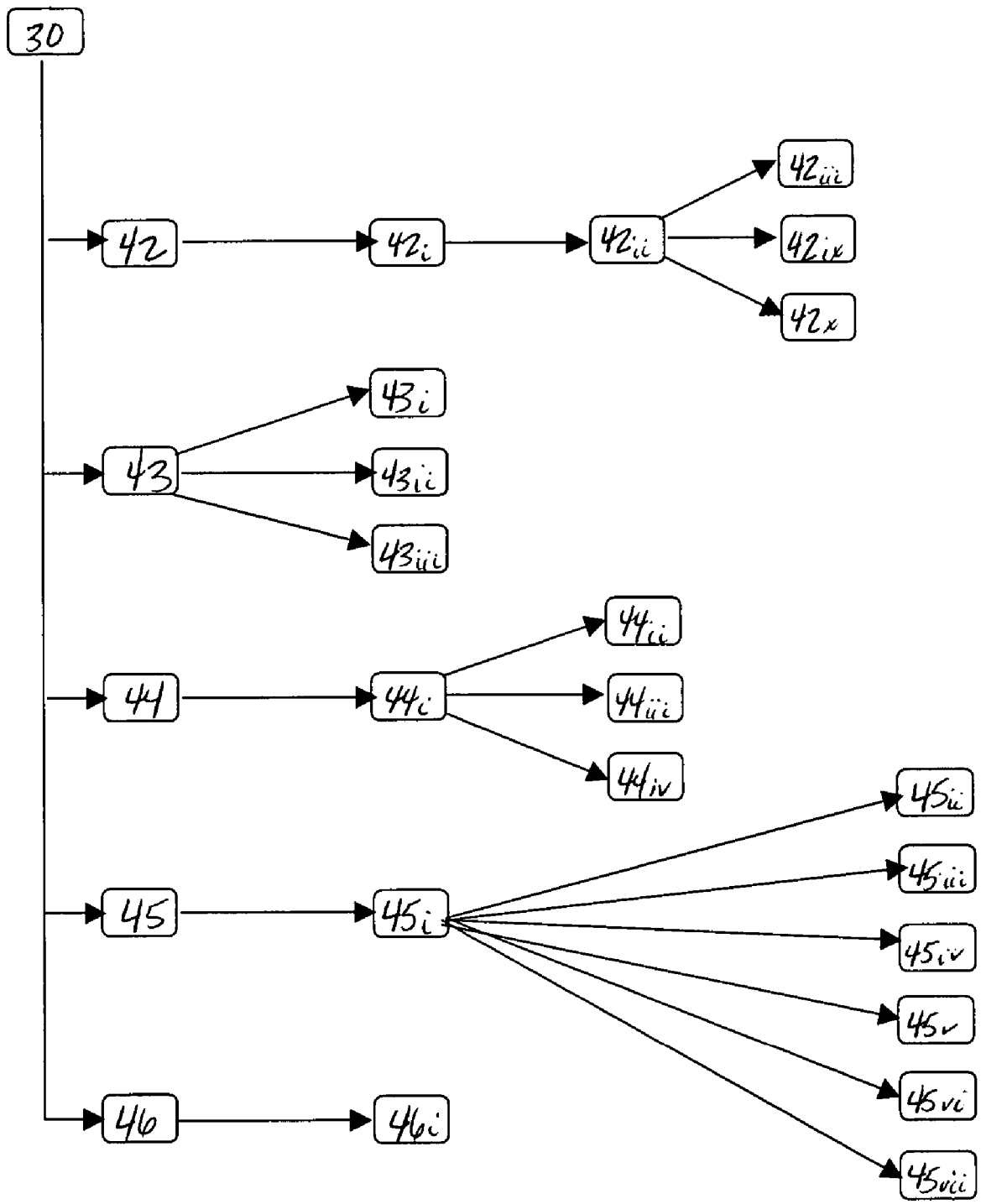
FIG. 4 illustrates the hierarchy of pages in a website.

FIG. 4 shows a hierarchy of the original files which form the original website 40. Menu option 32 will lead to the user to file 42, which in turn leads to the files 42$_{i \ldots v}$. Menu option 33 will lead to the user to file 43, which in turn leads to the files 43$_{i \ldots iii}$. Menu option 34 will lead to the user to file 44, which in turn leads to the files 44$_{i \ldots iv}$ and etcetera in similar fashion for all the original files of the original website. The collection of audio files will follow a hierarchy substantially similar to that shown in FIG. 4 to form an audible website which is described audibly in its entirety.

In the preferred embodiment, a small software program is installed on the home page of an original website, which plays a tone upon a user's visit indicating that the website is accessible with the present invention. Upon hearing the tone, a user presses a key on his keyboard, preferably the "1" key, and enters the audible website. The original website may close or remain open. After pressing the "1" key, the user navigates the audible website using keystroke command system. Audible narration is played through an audio interface at the user's computer, playing text and menus and indicating which keystrokes to press to listen to the other audio web files with in the audible website. Users can navigate website menus, fast forward and rewind content, and move from website to website without visual clues.

In the preferred embodiment, the device for instructing the computer which audio file to access is a keyboard having at least eighteen keys. The keys include ten numbered menu-option keys, four directional arrow keys, a space bar, a home key, and two keys for volume adjustment. The volume keys may be left and right bracket keys. See FIG. 5. Preferably the navigation system is standard across all participating websites and the keys function as follows:

the keys numbered 1 though 9 select associated menu options 51;
the key numbered 0 selects help 52;
the up arrow selects forward navigation 53;
the down arrow selects backward navigation 54;
the right arrow key selects the next menu option 55;
the left arrow key selects the previous menu option 56;
the spacebar repeats the audio track 57;
the home key selects the main menu 58;
the right bracket key increases the volume of the audible website 59;
the left bracket key decreases the volume of the audible website 60.

Figure 5:
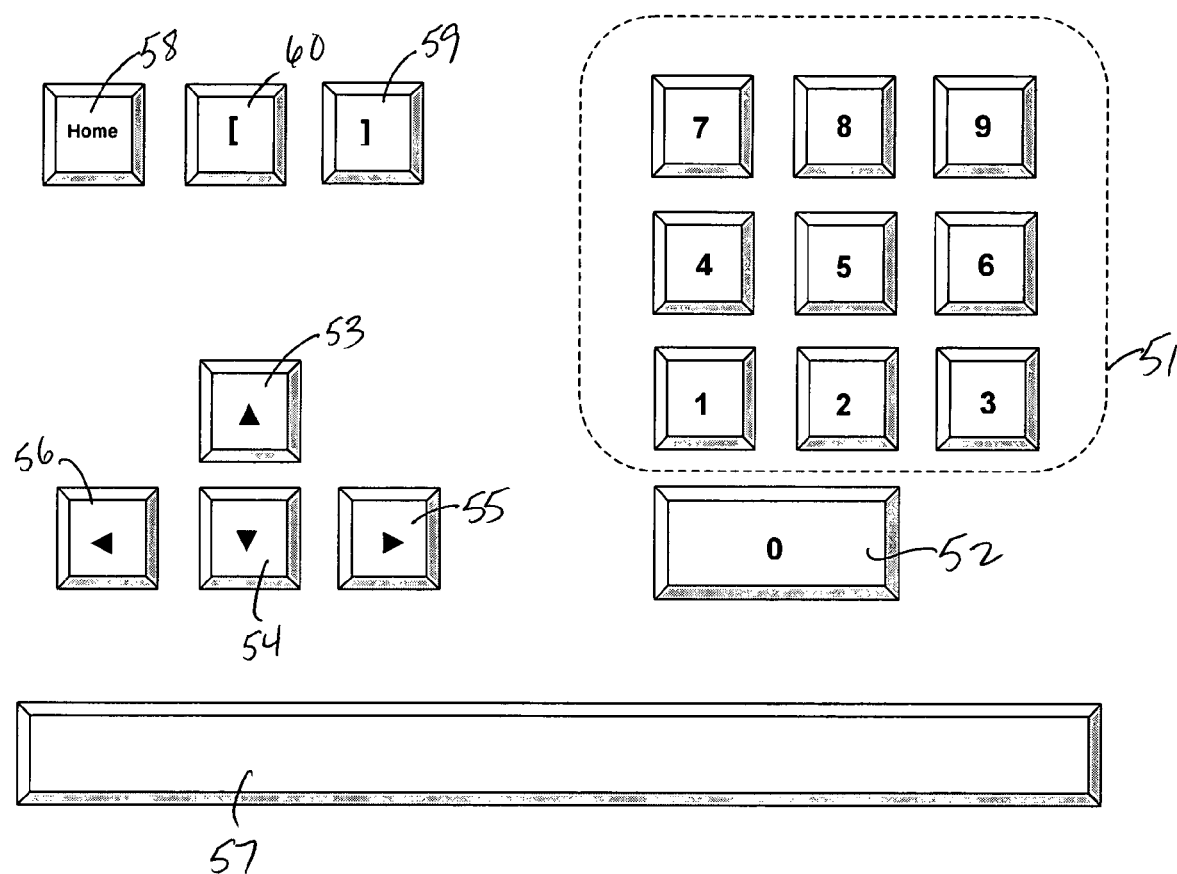
FIG. 5 illustrates the keyboard navigation system.

The keys may be arranged in clusters as shown in FIG. 5, using a standard numeric 10-key pad layout, or use alternative layouts such as a typewriter keyboard layout or numeric telephone keypad layout. Other types of devices may be used to instruct computer navigation. For example, for users who are not dexterous, a chin switch or a sip-and-puff tube can be used in place of a keyboard to navigate the audible websites.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

We claim:

1. A method for accessing and navigating a computer network without visual clues, the method comprising:
    a) creating one or more audio files from the text and non-text content of one or more original files on the computer network prior to a user requesting such audio files, the audio files having a navigation hierarchy substantially similar to that of the original files;
    b) playing a sound through an audio interface upon opening one of the original files indicating that the content of the original files is accessible audibly;
    c) requesting and opening the audio files;

d) playing the audio files through the audio interface; and
e) navigating the audio files using a keystroke navigation system.

2. The method according to claim 1 wherein the original files comprise an original website and the audio files comprise an audible website.

3. The method according to claim 1 wherein the keystroke navigation system is toneless.

4. The method according to claim 1 wherein:
a) the original files comprise an original website and the audio files comprise an audible website; and
b) the keystroke navigation system is toneless.

5. A method for accessing and navigating a computer network without visual clues, the method comprising:
a) creating an audible website prior to a user requesting access to such audible website by:
i. reading aloud in audible speech text that is visible on one or more files of an original website;
ii. describing aloud in audible speech content other than text on one or more files of an original website;
iii. recording the speech;
iv. recording other sounds on one or more files of an original website;
v. creating one or more audio files from the recordings of speech and sounds,
vi. assigning a hierarchy and navigation system to the audio files based on the original website design;
b) playing a sound upon a user's visit to the original website indicating that the original website is accessible audibly;
c) exiting the original website and entering the audible website;
d) playing the audible website through an audio interface; and
e) navigating the audible website using a keystroke navigation system.

6. A method for accessing audio files comprising:
a) playing a sound through an audio interface upon a user's visit to an original file indicating that the original file is accessible audibly;
b) pressing a key to exit the original file and enter an audio file;
c) playing the audio file through the audio interface.

7. The method according to claim 6 further comprising navigating through the audible website using a keystroke navigation system.

8. The method according to claim 6 wherein the key pressed to exit the original file and enter an audio file is numbered "1".

9. The method according to claim 6 wherein the original file comprises an original website and the audio file comprises an audible website.

10. The method according to claim 6 wherein:
a) the original file comprises an original website and the audio file comprises an audible website; and
b) the method further comprises navigating through the audible website using a keystroke navigation system.

11. A device for accessing an audible website comprising:
a) a computer network having an original website;
b) a program on the original website which plays a sound through an audio interface upon a user's visit to the original website indicating that the original website is accessible audibly;
c) a key which, when pressed, causes the user to exit the original website and enter an audible website residing on the computer network.

12. The device according to claim 11 further comprising:
a) a keystroke navigation system used to navigate the audible website.

13. The device according to claim 11 wherein the key is numbered "1".

14. A keystroke navigation device comprising:
a) at least ten keys marked 0-9;
b) at least four arrow keys, one of the four marked with up, down, left, and right arrows respectively; and
c) a spacebar,
d) a home key; and
e) a left bracket key and a right bracket key.

15. The device according to claim 14 wherein:
i. the keys numbered 1 though 9 select associated menu options;
ii. the key numbered 0 selects help;
iii. the up arrow selects forward navigation;
iv. the down arrow selects backward navigation;
v. the right arrow key selects the next menu option;
vi. the left arrow key selects the previous menu option;
vii. the spacebar repeats the audio track;
viii. the home key selects the main menu;
ix. the right bracket key increases the volume of the audible website;
x. the left bracket key decreases the volume of the audible website.

16. A method for navigating an audible website comprising pressing one or more keys of a toneless keystroke navigation system.

17. The method according to claim 16 wherein the audible website further comprises an audio track, a plurality of menu options, and a homepage; and the keystroke navigation system further comprises:
a) at least ten keys marked 0-9;
b) at least four keys marked with up, down, left, and right arrows; and
c) a spacebar;
d) a home key;
a) a left and right bracket key;
wherein:
pressing the keys numbered 1 though 9 select associated menu options;
pressing the key numbered 0 selects help;
pressing the up arrow selects forward navigation;
pressing the down arrow selects backward navigation;
pressing the right arrow key selects the next menu option;
pressing the left arrow key selects the previous menu option;
pressing the spacebar repeats the audio track;
pressing the home key selects the main menu;
pressing the right bracket key increases the volume of the audible website;
pressing the left bracket key decreases the volume of the audible website.

18. A method for creating an audible website comprising:
a) before the audible website is requested:
i. reading text that is visible on one or more files of an original website, wherein the reading is done in audible speech by a live human; and
ii. describing web content other than text on one or more files of an original website, wherein the describing is done in audible speech by a live human;
b) recording the speech;
c) recording other sounds on one or more files of an original website;
d) creating one or more audio files from the recordings of speech and sounds, e) assigning a hierarchy and navigation system to the audio files based on the original website design.

19. The method according to claim 18 further comprising:
a) playing a sound through an audio interface upon a user's visit to an original website indicating that the original website is accessible audibly;
b) pressing a key to exit the original website and entering the audible website;
c) playing the audible website through the audio interface.

20. The method according to claim 18 further comprising navigating through the audible website using a keystroke navigation system.

21. An apparatus for accessing and navigating a computer network without visual clues, the apparatus comprising:
a) a data input device comprising at least:
i. a spacebar that repeats an audio track when pressed;
ii. a right bracket key that increases the volume of the audio track when pressed; and
iii. a left bracket key that decreases the volume of the audio track when pressed;
b) audio files created according to the method:
i. reading aloud in audible speech text that is visible on one or more flies of an original website;
ii. describing aloud in audible speech web content other than text on one or more files of an original website;
iii. recording the speech;
iv. recording other sounds on one or more files of an original website;
v. creating one or more audio files from the recordings of speech and sounds,
vi. assigning a hierarchy and navigation system to the audio files based on the original website design, wherein the audio files reside on the computer network;
c) an audio interface;
d) wherein the audio files are played at the audio interface in response to data input on the data input device.

22. The apparatus according to claim 21 wherein the data input device is a keyboard.

* * * * *